(12) United States Patent
Justus

(10) Patent No.: US 7,810,623 B2
(45) Date of Patent: Oct. 12, 2010

(54) CENTRIFUGAL FRICTION CLUTCH WITH IMPROVED THERMAL MANAGEMENT

(76) Inventor: Marvin Wayne Justus, 1704 Kings Rd., Vista, CA (US) 92084

( * ) Notice: Subject to any disclaimer, the term of this patent is extended or adjusted under 35 U.S.C. 154(b) by 0 days.

(21) Appl. No.: 11/136,809

(22) Filed: May 24, 2005

(65) Prior Publication Data

US 2006/0266615 A1    Nov. 30, 2006

(51) Int. Cl.
F16D 43/08 (2006.01)
F16D 13/72 (2006.01)

(52) U.S. Cl. .............. 192/105 C; 192/70.12; 192/103 A; 192/113.23

(58) Field of Classification Search ........... 192/105 C, 192/103 A
See application file for complete search history.

(56) References Cited

U.S. PATENT DOCUMENTS

| | | | | |
|---|---|---|---|---|
| 1,909,191 A | * | 5/1933 | Stafford | 475/262 |
| 2,039,590 A | * | 5/1936 | Freeborn | 192/70.11 |
| 4,111,291 A | * | 9/1978 | Horstman | 192/105 C |
| 4,856,637 A | | 8/1989 | Gebhart | |
| 5,284,234 A | * | 2/1994 | Miglizzi | 192/105 C |
| 5,638,935 A | | 6/1997 | Fehring | |
| 5,785,163 A | * | 7/1998 | Bell | 192/70.3 |
| 6,705,446 B2 | * | 3/2004 | Drussel et al. | 192/83 |
| 6,708,807 B1 | | 3/2004 | Martin | |
| 6,823,975 B2 | * | 11/2004 | Martin | 192/105 C |

OTHER PUBLICATIONS

Kawasaki, Motorcycle Owner's Manual KX450F, Jul. 2007, pp. 58-61, Kawasaki Heavy Industries, Ltd., United States.

* cited by examiner

*Primary Examiner*—Richard M. Lorence
(74) *Attorney, Agent, or Firm*—X-Patents, APC

(57) ABSTRACT

A centrifugal friction clutch providing for a separation between the pressure and/or fixed plates and the friction surfaces of the clutch discs to provide for reduced heat transfer to said pressure and fixed plates, reduced risk of deformation of said plates, and improved distribution of axial forces to maintain maximum frictional engagement. Said pressure plates and fixed plates further including air impeller vanes or similar structures on their interior surface to further improve heat dissipation and reduce the risk of deformation.

3 Claims, 5 Drawing Sheets

CENTRIFUGAL FRICTION CLUTCH WITH IMPROVED THERMAL MANAGEMENT

BACKGROUND OF THE INVENTION

1. Field of the Invention

This invention relates generally to the friction clutches, and particularly to centrifugal friction clutches that engage at a predetermined speed of rotation of a drive member.

2. Background

Centrifugal friction clutches are well known in the art. For example, U.S. Pat. No. 4,111,291 discloses a centrifugal friction clutch having at least one input or pressure plate, at least one fixed plate, and at least one output or driven disc concentric with the pressure and fixed plates. At a predetermined speed of input rotation, the pressure plate and output disc or discs are forced to move axially into frictional engagement by centrifugal weights or cam mechanisms on the pressure plate. These cam mechanisms are constrained by springs, such that the speed of frictional engagement can be modified by adjusting the spring force.

The most significant design challenge with respect to centrifugal friction clutches is the control and dissipation of heat generated by the frictional engagement of the plates and discs. In prior art clutches, frictional surfaces of the friction discs contact directly with the pressure plate and the fixed plate. The resulting heat builds up in the plates and eventually causes distortions in the surfaces of the plates. These distortions are amplified by the opposing bending stresses induced in the pressure plate by the cam mechanisms and springs.

In prior art clutches, the resulting distortions in the pressure plate reduce frictional engagement between the discs and plates, reducing the efficiency of the frictional engagement and generating additional unwanted heat. This cycle eventually causes permanent distortion of the pressure and/or fixed plates, causes the clutch to fail, and requires the replacement or repair of the pressure and/or fixed plates and other related components.

Efforts to address the problems caused by waste heat in such clutches have been unsatisfactory. For example, U.S. Pat. No. 6,823,975 discloses the use of a plurality of "air impeller vanes" or grooves in the exterior side of the pressure and/or fixed plates, opposite the interior or contact friction side of the plates, to provide air cooling and promote heat dissipation. However, due to the small size of the clutch, the limited air intake, and turbulent air flow patterns, this approach provides only limited benefits. The result is some delay, but not prevention, in the distortion of the pressure and fixed plates.

The present invention addresses this problem by separating the surfaces used for frictional engagement from the surfaces of the pressure and fixed plates. This separation provides for dramatically improved heat dissipation, reduced heat transfer to the pressure and/or fixed plates, and the elimination or reduction of associated distortions to the surface of the pressure and fixed plates. It further provides for improved frictional engagement even in situations where there is either temporary or permanent distortion of the pressure and/or fixed plates. The present invention further provides for the use of impeller vanes on the interior side of the pressure and fixed plates to further dissipate heat generated during clutch operation.

SUMMARY OF INVENTION

The present invention is directed to meeting the need for a durable, high-performance, centrifugal friction clutch for use in a variety of applications, including without limitation go-carts, motorcycles and mini-bikes. In one embodiment, the present invention separates the surfaces used for frictional engagement from the pressure and fixed plates of the clutch by using an additional disc to move the friction surface interface off of the pressure and fixed plates. This separation of the friction surfaces from the pressure and fixed plates substantially reduces the amount of heat that is transferred to the pressure and fixed plates. Impeller vanes or channels are further provided on the interior surfaces of the pressure and fixed plates to further dissipate heat generated during normal clutch operation.

It is an object of the present invention to reduce heat induced distortion of the pressure and fixed plates in a centrifugal friction clutch in order to maintain maximum engagement of the friction surface contact area. It is a further object of the invention to maintain maximum engagement of the friction surface contact area even in situations where there has been temporary or permanent distortion of the pressure and/or fixed plates. This results in improved performance, more consistent engagement speeds, increased life for key components including friction discs, and reduced maintenance costs in both wet and dry centrifugal friction clutches of various configurations including both flat and conical friction discs.

DETAILED DESCRIPTION OF THE PREFERRED EMBODIMENTS

Figure 1:
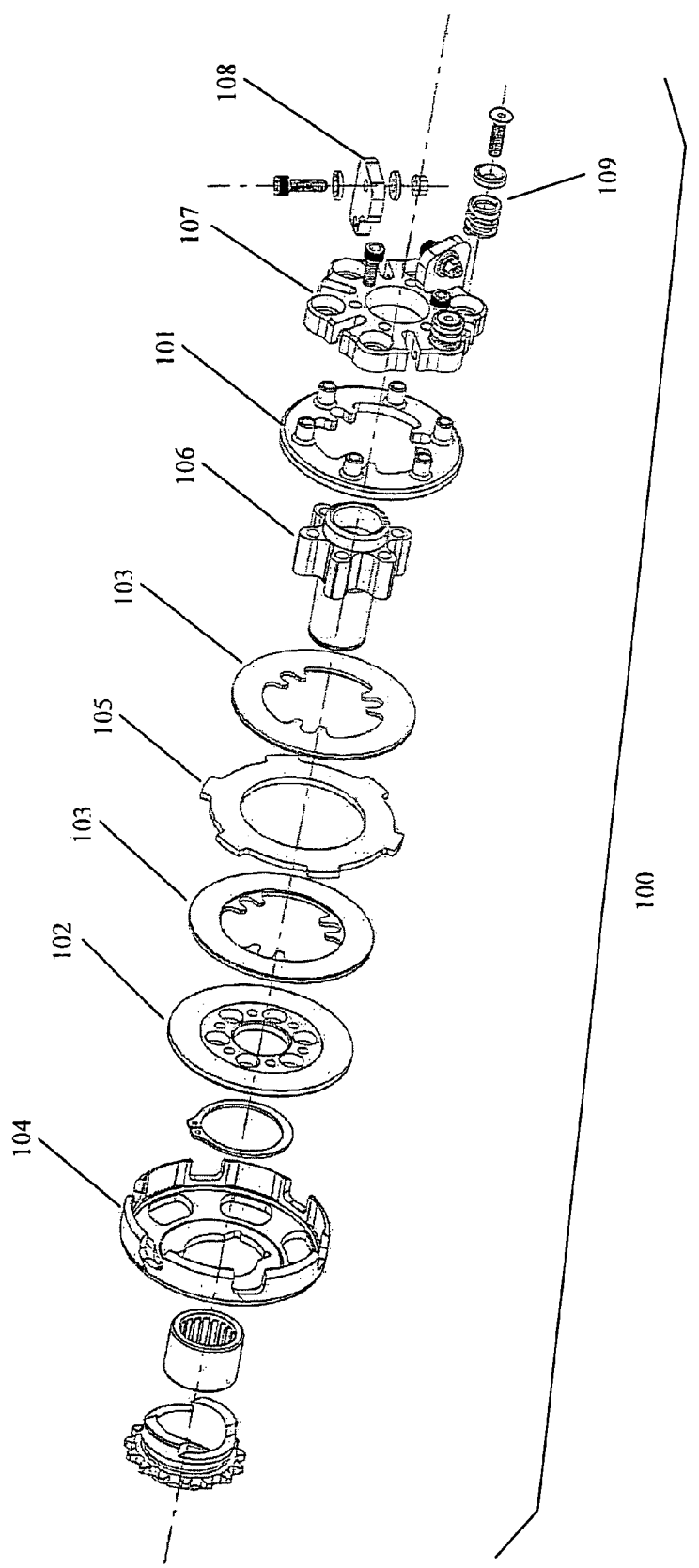
FIG. 1 is an exploded view illustration of an exemplary dry centrifugal friction clutch that practices the present invention.

As illustrated in detail in FIG. 1, the present invention is embodied in an exemplary dry centrifugal clutch 100. The clutch comprises a pressure plate 101 and a fixed plate 102, with a series of concentric discs disposed between them. These discs include both friction or drive discs 103 with drive lugs on the inside diameter for interconnection with the rotating drive hub 106 or other drive member, and a floater or driven disc 105 with drive lugs on the outside diameter for interconnection with the clutch drum 104 or other rotatable driven member. In this embodiment, the friction or drive discs 103 have frictional surfaces on their interior sides, adjacent to the floater or driven disc 105.

On the exterior side of the pressure plate is a pressure mechanism 107 with one or more weighted levers or cams 108. As the drive hub rotates, these levers or cams rotate outward, inducing an axial force that presses the pressure plate 101, friction discs 103 and floater disc 105 against the fixed plate 102. Once the drive hub 106 reaches a sufficient rotational speed, the force on the pressure plate 101 reaches a sufficient level to engage the frictional surfaces on the discs. This causes the floater or driven disc 105 to rotate, which in turn causes the clutch drum 104 or other driven member to rotate, transferring power to the drive train. Each weighted lever or cam 108 has a spring mechanism 109 that can be adjusted to control the speed of engagement.

Figure 3:
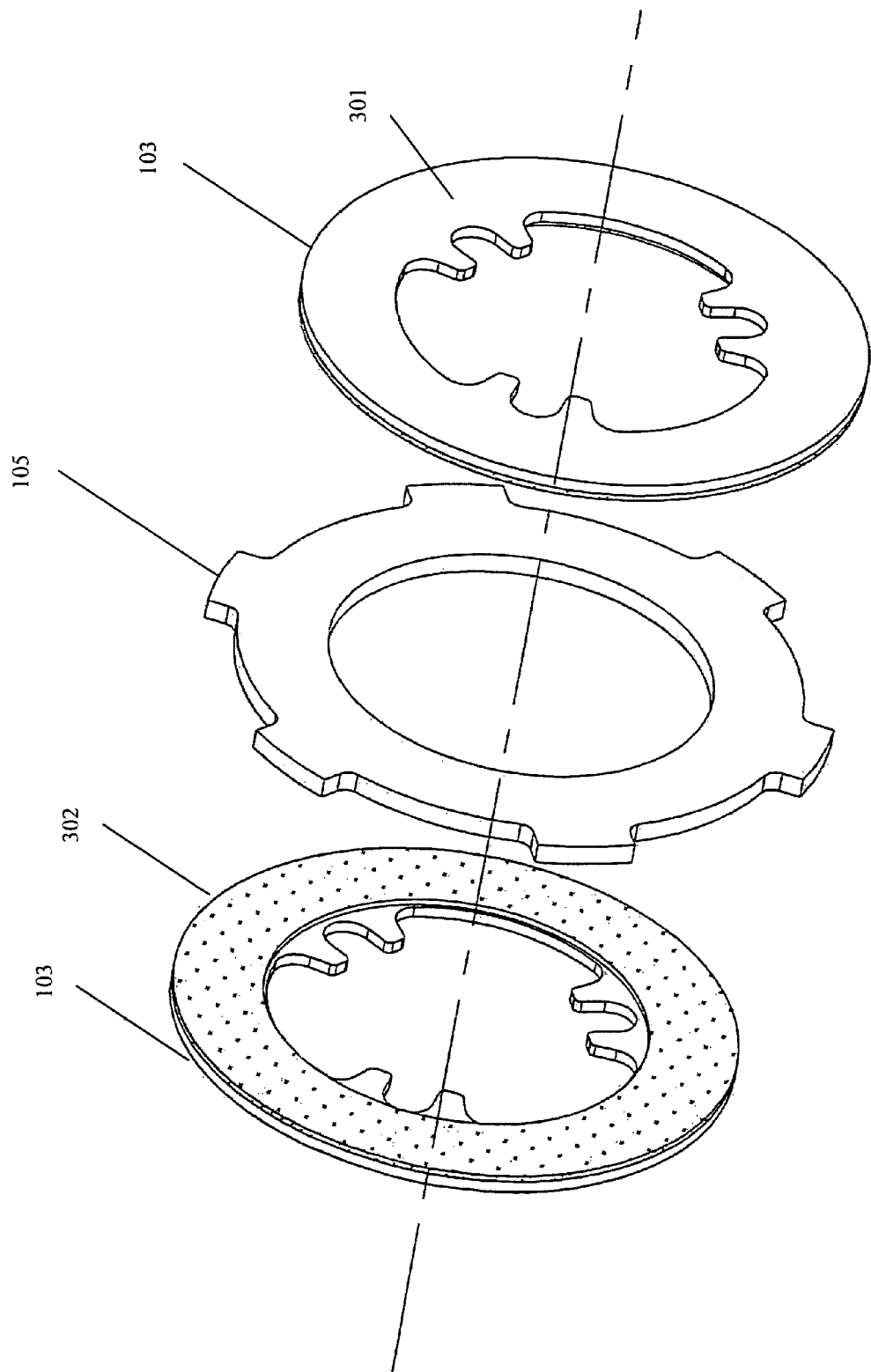
FIG. 3 is an exploded view detailing a preferred embodiment of the friction discs of an exemplary dry centrifugal clutch that practices the present invention.

In this preferred embodiment, there are two single-sided friction discs 103 and one floater disc 105. As shown in FIG. 3, each friction disc 103 has one side that is smooth 301, and one side that has a friction surface 302. In this preferred embodiment, the floater disc 105 is placed between the two frictional surfaces 302 of the friction discs 103. Thus, neither the pressure plate 101 nor the fixed plate 102 engages a frictional surface. Instead, both plates are physically separated from the frictional surfaces by the body of the friction discs 103, which are rotating at the same speed as the pressure and fixed plates. This reduces the amount of heat that is transferred to the pressure plate 101 and the fixed plate 102, which in turn reduces the likelihood of distortion of the pressure and fixed plates. Moreover, because the body of the friction discs evenly distributes the force exerted by the pressure plate across the frictional surfaces even when there has been a distortion of the pressure or fixed plates, maximum engagement is maintained even in situations where there has been distortion of the fixed and/or pressure plates.

Figure 2:
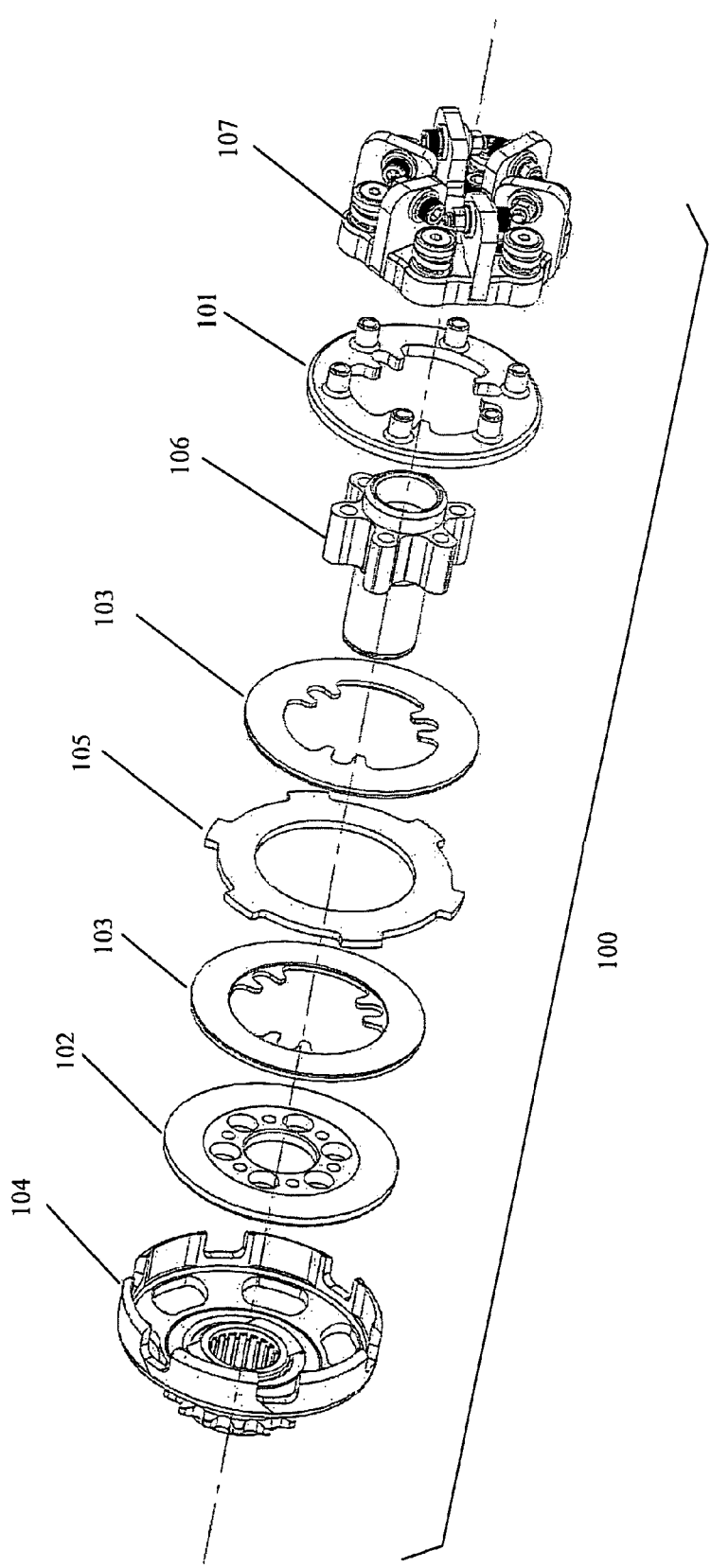
FIG. 2 is an exploded view illustration of the same exemplary dry centrifugal clutch partially assembled.

In another preferred embodiment, additional alternating friction or drive and floater or driven discs are disposed between the single sided friction discs 103 shown in FIGS. 1-3. The additional friction discs have frictional surfaces on both sides to engage the surfaces of the adjacent floater discs.

Figure 4:
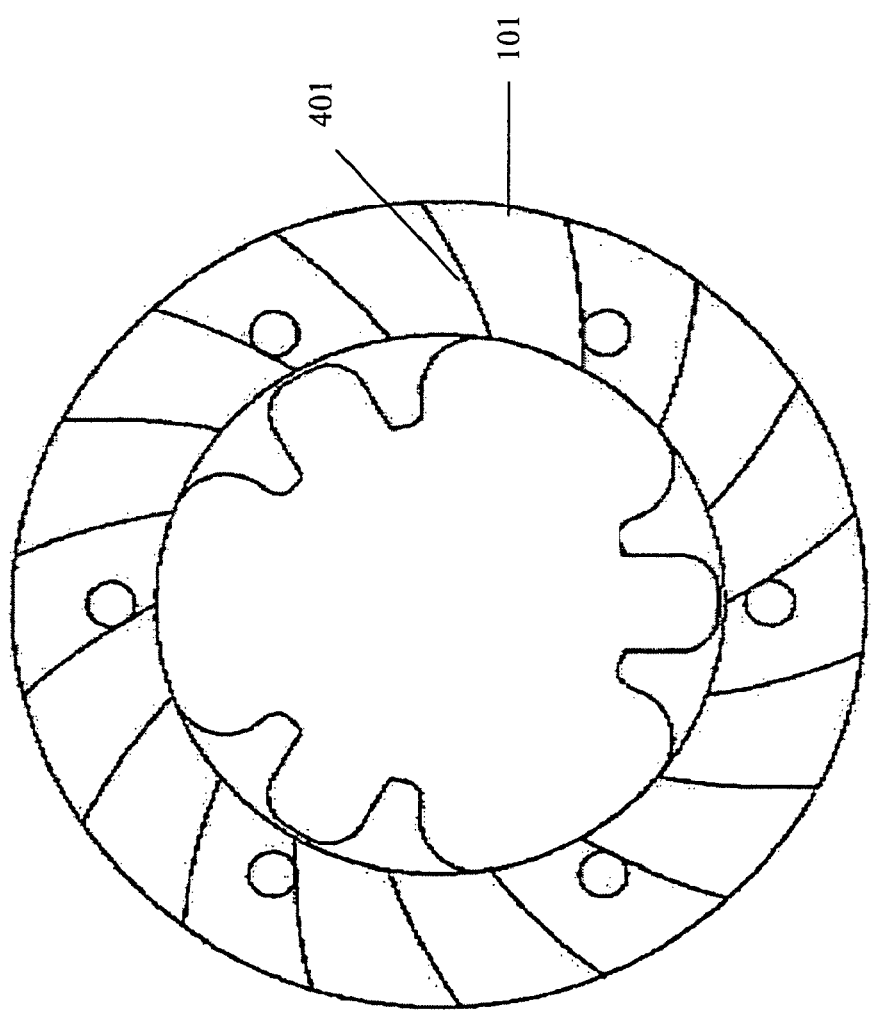
FIG. 4 is an illustration of an exemplary pressure plate with impeller vanes.
Figure 5:
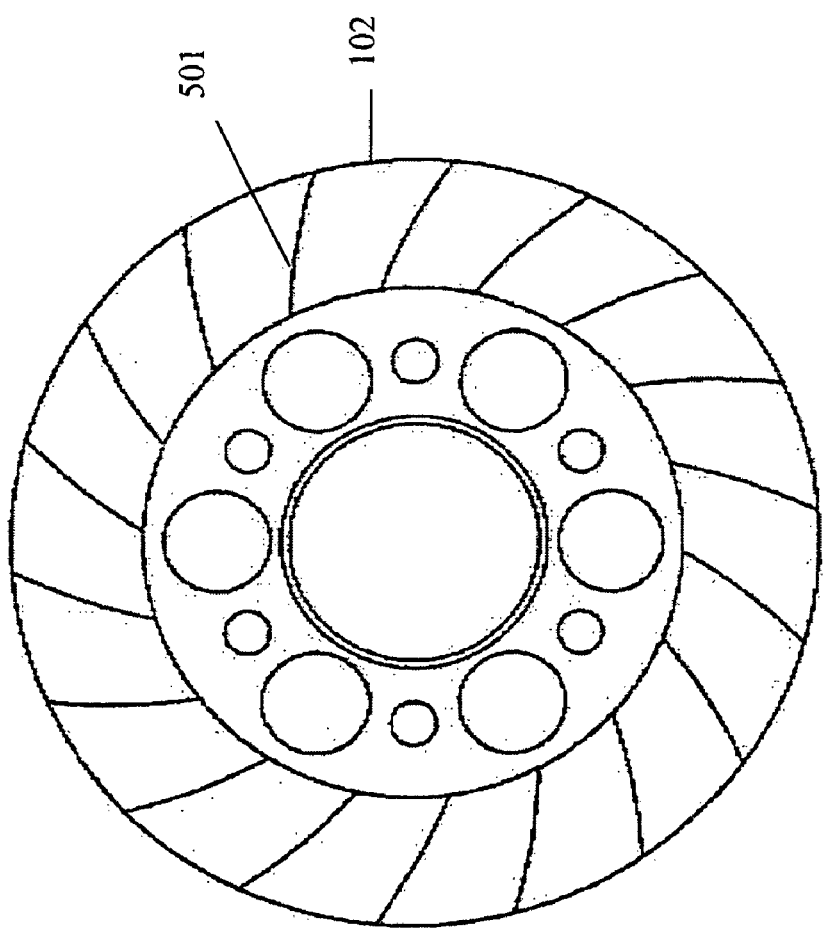
FIG. 5 is an illustration of an exemplary fixed plate with impeller vanes.

As shown in FIGS. 4 and 5, in another preferred embodiment the pressure and fixed plates 101, 102 in the present invention incorporate impeller vanes 401, 501 or similar structures on their interior surfaces to help dissipate heat, further reducing the heat that is transferred and minimizing distortion of these plates. It will be appreciated by those skilled in the art that such heat dissipation structures can take a variety of forms and configurations without departing from the spirit and scope of the invention.

It will be appreciated by those skilled in the art that the separation between the frictional surfaces and the pressure plate and fixed plate can be achieved using a variety of configurations, including without limitation multiple friction discs and floater discs, as well as friction and floater discs of varying construction and configuration, including conical or other appropriate configurations. It will be further appreciated by those skilled in the art that the present invention can be applied to a variety of centrifugal friction clutches, including both wet and dry clutches of various particular types.

What is claimed is:

1. A centrifugal clutch comprising:
   a rotating input drive member;
   a rotatable output driven member;
   a plurality of drive discs mounted for rotation at the same speed as said drive member;
   at least one driven disc mounted for rotation with said driven member and being interposed between two of said drive discs;
   said drive discs comprising at least one frictional surface for engagement with said driven disc;
   a pressure plate mounted adjacent to one of said drive discs for rotation at the same speed as said drive member that moves axially to press the drive discs and driven disc together;
   a fixed plate that is axially fixed relative to the pressure plate, drive discs and driven disc, and mounted for rotation at the same speed as said drive member;
   wherein said pressure plate is physically separated from all of said frictional surfaces of said drive discs.

2. The clutch of claim 1, wherein said fixed plate is physically separated from all of said frictional surfaces of said drive discs.

3. A centrifugal clutch comprising:
   a rotating input drive member;
   a rotatable output driven member;
   a plurality of drive discs mounted for rotation at the same speed as said drive member;
   at least one driven disc mounted for rotation with said driven member and being interposed between two of said drive discs;
   said drive discs comprising at least one frictional surface for engagement with said interposed driven disc;
   a pressure plate mounted adjacent to one of said drive discs for rotation at the same speed as said drive member that moves axially to press the drive discs and driven disc together;
   a fixed plate that is axially fixed relative to the pressure plate, drive disc and driven disc, and mounted for rotation at the same speed as said drive member;
   wherein said fixed plate is physically separated from all of said frictional surfaces of said drive discs.

* * * * *